June 11, 1940.    J. J. JAKOSKY ET AL    2,203,729
METHOD AND APPARATUS FOR USE IN DETERMINING THE GEOLOGIC NATURE AND
CHARACTERISTICS OF A FORMATION TRAVERSED BY A BOREHOLE
Filed Nov. 19, 1938    2 Sheets-Sheet 1
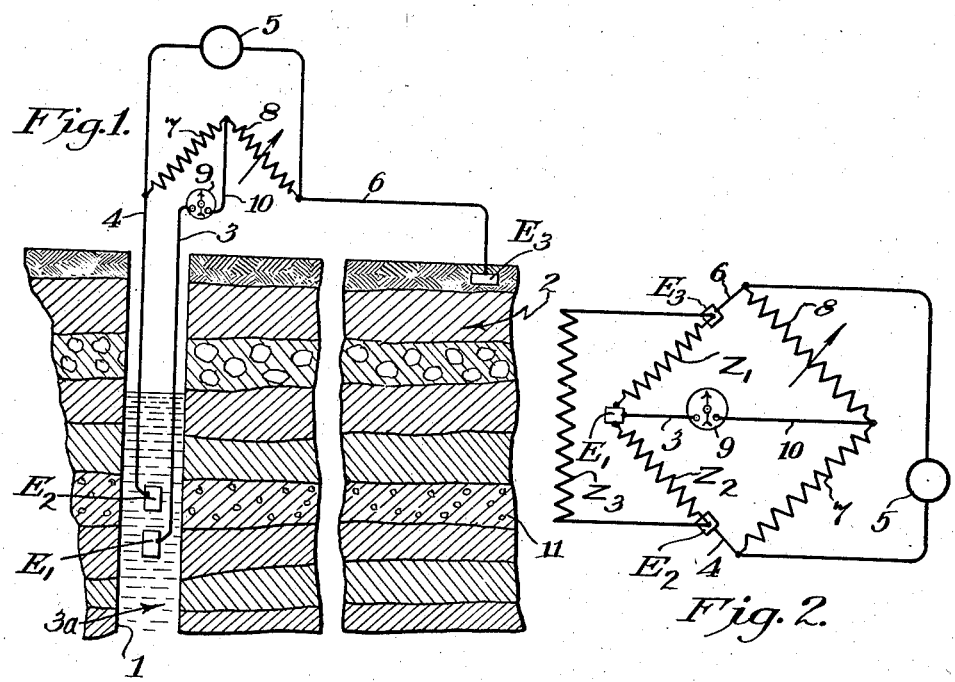
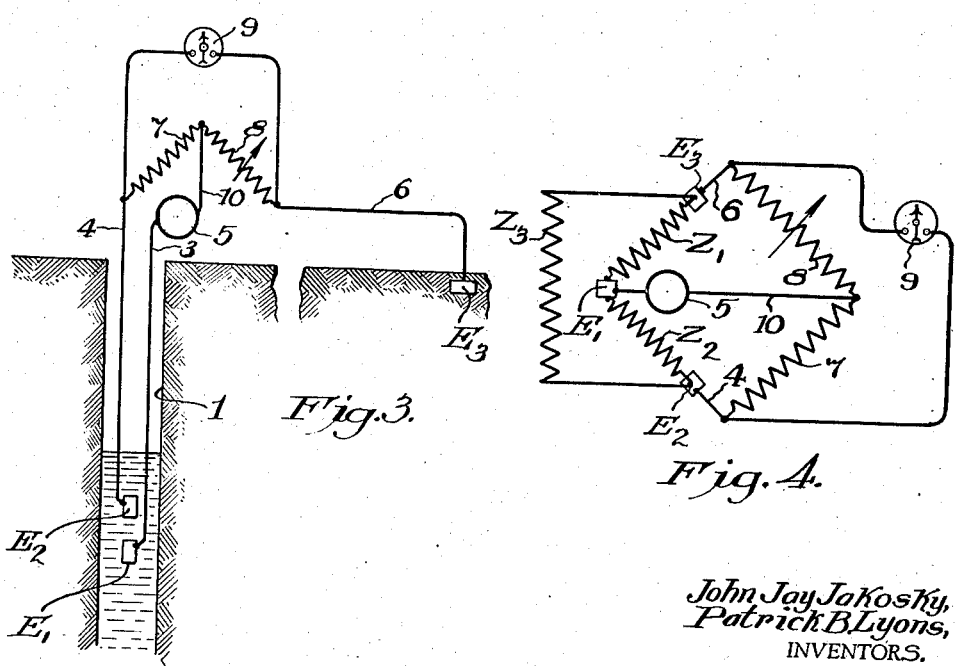
John Jay Jakosky,
Patrick B. Lyons,
INVENTORS.
BY
ATTORNEYS.

June 11, 1940.    J. J. JAKOSKY ET AL    2,203,729
METHOD AND APPARATUS FOR USE IN DETERMINING THE GEOLOGIC NATURE AND
CHARACTERISTICS OF A FORMATION TRAVERSED BY A BOREHOLE
Filed Nov. 19, 1938    2 Sheets-Sheet 2

John Jay Jakosky
Patrick B. Lyons
INVENTORS.

BY
ATTORNEYS

Patented June 11, 1940

2,203,729

UNITED STATES PATENT OFFICE 2,203,729

METHOD AND APPARATUS FOR USE IN DETERMINING THE GEOLOGIC NATURE AND CHARACTERISTICS OF A FORMATION TRAVERSED BY A BOREHOLE

John Jay Jakosky and Patrick B. Lyons, Los Angeles, Calif., assignors, by direct and mesne assignments, to Schlumberger Well Surveying Corporation, Houston, Tex., a corporation of Delaware Application November 19, 1938, Serial No. 241,402

11 Claims. (Cl. 175—182)

This invention relates to a method and apparatus for use in the electrical exploration of the subsurface and pertains more particularly to a method and apparatus for determining the geologic nature and characteristics of the formation traversed by a borehole through determination of the anisotropic properties of the various strata.

It has been found that in stratified sections the various strata show a marked difference in conductivity or other electrical characteristic as measured in a direction substantially perpendicular or transverse thereto. For example, the greatest conductivity in such stratified sections is in general manifested in a direction parallel to the bedding planes. Furthermore, it has been found that in recently, poorly stratified sections and conglomerates these anisotropic properties are not so pronounced. Thus the nature of a geologic formation traversed by a borehole may be ascertained from a determination of the anisotropic properties of the strata so traversed.

In the copending application of John Jay Jakosky, Serial No. 91,708, filed July 21, 1936 and now issued as Patent No. 2,140,798, a method and apparatus for determining the anisotropic properties of the formation traversed by a borehole have been described, in which separate measurements are taken of an electrical characteristic of the formation in a direction substantially parallel to the bedding planes of the strata and in a direction transverse thereto, whereby the degree of anisotropy of the formation may be determined by comparing the two measurements so obtained.

A particular object of the present invention is to provide an advantageous electrical method and apparatus for directly indicating or recording the relationship between the characteristics of the formation in a direction along and parallel to the bedding planes thereof and in a direction transverse thereto, that is, to directly indicate or record the anisotropic properties of the formation.

Another object of the invention is to provide a method and apparatus for directly determining the ratio between the electrical properties of the formation traversed by a borehole in a direction along and parallel to the bedding planes and in a direction transverse thereto.

Another object of the invention is to provide a method and apparatus for directly measuring the difference in electrical characteristics of the formation traversed by a borehole in a direction along and parallel to the bedding planes and in a direction transverse thereto.

A further object of the invention is to provide a method and apparatus for directly determining the relative anisotropic properties of the different strata traversed by a borehole at different depths.

Further objects and advantages of the invention will become apparent as the description proceeds.

According to this invention we pass electric current through the earth between electrodes connected thereto, in such manner as to produce a flow of electric current through the formation adjacent a borehole in a direction substantially transverse to the bedding planes of the strata in such formation, and also to produce a flow of electric current substantially along and parallel to the bedding planes of such strata adjacent the borehole, and take an electrical measurement which is indicative of the relation between the electrical characteristics, in these two directions, of the formation traversed by the current flowing in those directions.

For example, such an electrical measurement may be taken in an electric circuit connected to electrode means including a pair of vertically separated electrodes located within the path of the current flowing substantially transverse to the bedding planes, at least one and preferably both of said electrodes being positioned within the borehole, and also including an electrode connected to the earth at a position removed from the borehole, said last-mentioned electrode and at least one electrode within the borehole being located within the path of the current flowing substantially parallel to the bedding planes. The measurement so taken is indicative of the relation between an electrical characteristic of the path of the current flowing in a direction substantially transverse to the bedding planes of the strata, and a comparable characteristic of the path of the current flowing in a direction substantially along and parallel to the bedding planes of such strata. Such a measurement gives information regarding the anisotropy of the formation. We preferably repeat the measurement with at least one of the electrodes located at different depths in the borehole so that variations in the anisotropic properties of the strata traversed at different depths by the borehole may be determined from variations in the measurements. If the two vertically separated electrodes are both located within the borehole, these electrodes are preferably moved simultaneously to different depths in the borehole and the measurements may be continuously recorded against depth as the electrodes are moved.

The flow of electric current through the earth in the manner above described may be established through a suitably positioned system of electrodes including at least one electrode within the borehole, and the electrodes employed for this purpose may be the same electrodes as are employed in taking measurements, or may be wholly or partly separate from the measuring electrodes. In any event, when taking successive measurements at different depths within the borehole, the paths of current flow along and transverse to the bedding planes of the strata, when taking each measurement, are such that the respective measuring electrodes are within the respective paths of current flow, and for this purpose a current or energizing electrode within the borehole may be moved to different depths as the depth of measurement is varied.

Apparatus according to this invention may comprise a plurality of vertically spaced electrodes electrically connected to the earth, at least one and preferably all of said electrodes being positioned within a borehole and movable to different depths in the borehole through the agency of any well-known means such as a cable hoist located on the earth's surface, and at least one other electrode connected to the earth at a position removed from the borehole. Electric circuit means is provided including a connection through an insulated conductor to one electrode within the borehole and including means for producing a flow of electric current through the earth between said one electrode and at least one of the other electrodes in such manner as to cause current to flow through the formation adjacent the borehole in a direction substantially transverse to the bedding planes of the strata in said formation, and also to cause an electric current to flow through the formation adjacent the borehole in a direction substantially along and parallel to the bedding planes of the strata. An electrical measuring means such as an indicating or recording, current or potential responsive, electrical measuring instrument is connected to two vertically spaced electrodes at least one and preferably both of which are located in the borehole, and to an electrode connected to the earth at a position removed from the borehole. The electrical measuring means is operable to produce indications in response to the relation between an electrical characteristic of the path of current flow through the formation in a direction substantially transverse to bedding planes of the strata and a comparable electrical characteristic of the path of current flow through the formation in a direction substantially along and parallel to the bedding planes of the strata.

References herein to an electrode removed from the borehole, in connection with the passage of an electric current through the earth between such an electrode and an electrode positioned within a borehole, will be understood to mean an electrode electrically connected to the earth and sufficiently removed from, or so located with respect to, the borehole that at least a substantial proportion of the current flow therebetween will take place in directions generally along and parallel to the bedding planes of the strata in the formation adjacent the borehole. Similarly, references herein to an electrode removed from the borehole, in connection with measurements involving an electrical characteristic of the earth between such an electrode and an electrode within the borehole, will be understood to mean an electrode electrically connected to the earth and sufficiently removed from, or so located with respect to, the borehole that variations in measurements of an electrical characteristic of the earth between said electrodes, as the electrode within the borehole is moved to different depths, will be primarily indicative of variations in such electrical characteristic of the strata at the different depths, in a direction substantially along and parallel to the bedding planes of the strata.

Thus, in each of the above cases the electrode removed from the borehole may be connected to the earth and spaced laterally from the borehole by a distance on the order of one-third or more of the depth of the electrode within the borehole, or, if desired, it may be located within a neighboring borehole, in which case it may be spaced a lesser distance from the borehole being explored, as disclosed in the copending application of John Jay Jakosky, Serial No. 55,600, filed December 21, 1935.

The essential concept of this invention lies in providing a method and apparatus for obtaining a direct comparison of the electrical properties of the strata in two transverse directions, and it will be appreciated that numerous forms of apparatus may be used to obtain such a direct comparison when utilizing the electrode arrangements shown.

We have illustrated simple forms of our apparatus and circuit diagrams therefor in the accompanying drawings, and referring thereto:

Fig. 1 is a diagrammatic cross-section of a portion of a stratified area traversed by a borehole with diagrammatically illustrated apparatus according to our invention;

Fig. 2 is a simplified circuit diagram of the apparatus shown in Fig. 1, illustrating the existing current paths;

Fig. 3 is a view comparable to Fig. 1, showing an alternative way of connecting the apparatus illustrated in Fig. 1;

Fig. 4 is a simplified wiring diagram therefor;

Figure 5:
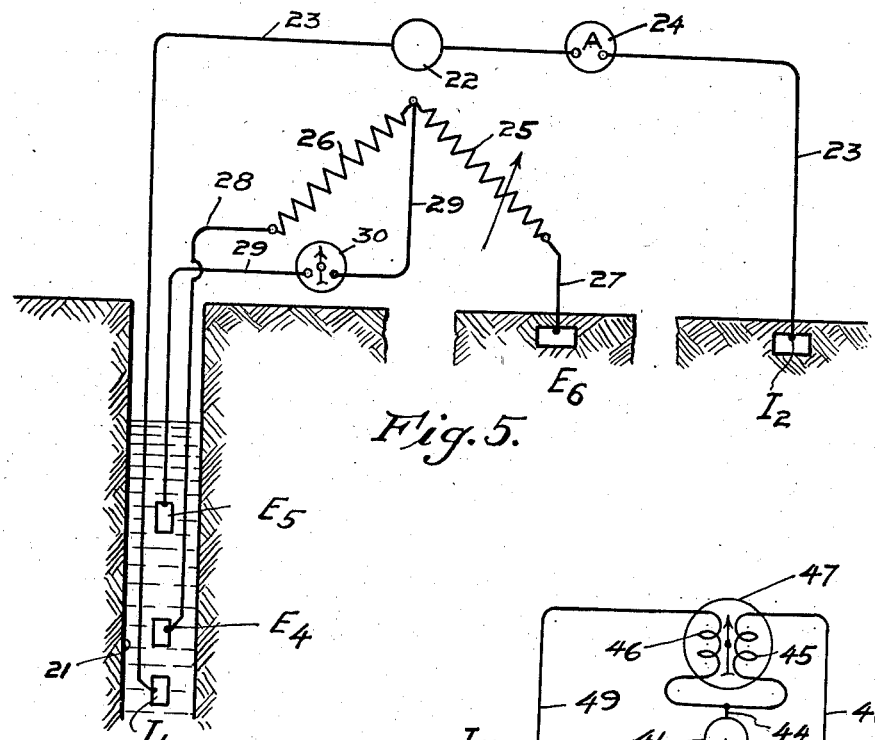
Fig. 5 is a diagrammatic cross-section showing a modified form of apparatus.

Referring to Fig. 1, a borehole 1 is shown as having traversed the earth's strata 2 and as filled or partly filled with a conductive fluid 3a. Exploring electrodes $E_1$ and $E_2$ are shown located within the borehole and in contact with the fluid contained therein, and spaced vertically from one another. A third electrode $E_3$ is shown connected to the earth at a position laterally removed from the borehole 1, for example, at a distance which is on the order of one-third or more the depth of the electrodes $E_1$ and $E_2$ within the borehole. Insulated conductors 3 and 4 are shown respectively connected to the electrodes $E_1$ and $E_2$ and leading to the earth's surface, and well-known means such as a cable hoist, not shown, is provided for moving the electrodes $E_1$ and $E_2$ to different depths in the borehole, preferably simultaneously.

A diagrammatically indicated controllable source of curent 5, such as a battery, a direct current generator, a source of high or low frequency alternating current or a source of intermittent unidirectional or reversed pulsating current, is shown connected in series between the electrodes $E_2$ and $E_3$ through the agency of the conductor 4 and a conductor 6 connected to the electrode $E_3$. A pair of resistors or impedances 7 and 8 are shown connected in shunt with the current source 5, and a galvanometer 9 or other suitable indicating or recording instrument is shown connected in series between the electrode $E_1$ and the point of connection of the resistors 7 and 8, through the agency of the conductor 3 and a conductor 10 connected to said resistors.

Referring now to Figs. 1 and 2, it will be seen that there is an electric circuit through the earth between the electrodes $E_1$ and $E_3$, a substantial portion of which circuit comprises a current path along and parallel to the bedding planes of the strata adjacent the borehole, for example, along and parallel to the bedding planes of a stratum designated at 11. The resistance, impedance or other electrical characteristic of this current path between the electrodes $E_1$ and $E_3$ is designated generally as $Z_1$. Another electric circuit exists in the borehole between the electrodes $E_1$ and $E_2$ and comprises a plurality of current paths partly through the fluid between electrodes $E_1$ and $E_2$ and partly through adjacent portions of the stratum 11 in a direction transverse to the bedding planes thereof. The electrical resistance or other characteristic of this electrical circuit transverse to the strata between the electrodes $E_1$ and $E_2$ is designated as $Z_2$.

By inspection of Fig. 2 it may be seen that the resistors 7 and 8 and the impedances $Z_1$ and $Z_2$ comprise the respective adjacent arms of a four-arm bridge circuit and that the source of current 5 and the indicating instrument 9 are each connected between conjugate points on this four-arm bridge. In this particular embodiment the electrical measuring instrument 9 is connected to the electrode $E_1$ which is the point connecting the electrical circuits designated as $Z_1$ and $Z_2$. With such an arrangement the ratio of the impedances $Z_1$ and $Z_2$, or the anisotropy of the strata may be directly obtained from the adjustment of the resistor 8 required to give a null reading on the instrument 9.

There is, however, an additional electric circuit through the earth which would appear to complicate the situation and prevent a true reading from being obtained. This circuit is represented by the current path through the earth between the electrodes $E_2$ and $E_3$ and it is designated in Fig. 2 as $Z_3$. Upon careful consideration of Fig. 2 it may be ascertained that the impedance $Z_3$ will have no effect upon the ratios read from the bridge circuit, since it may be considered purely as a leakage path in shunt with the source of current 5. Thus the relation of the two earth circuits $Z_1$ and $Z_2$ may be determined when using these circuits as the arms of a bridge even though there is a third circuit $Z_3$ in shunt with these two circuits in series.

Referring to Figs. 3 and 4, an alternative connection of the apparatus to the electrode arrangement of Fig. 1 is shown, and, in this instance, the positions of the galvanometer 9 and the current source 5 have been interchanged so that the galvanometer is now in shunt with the resistors 7 and 8 and the current source 5 is connected to the electrode $E_1$ which is the point of connection of the earth circuits $Z_1$ and $Z_2$. As in the case illustrated before, the leakage circuit $Z_3$ is in shunt with the earth circuits $Z_1$ and $Z_2$ in series. Again, this does not prevent operation of the circuit except possibly to decrease the sensitivity of the measurement, since the impedance $Z_3$ may be considered as in shunt with the galvanometer 9. Measurements may be made with the bridge circuit shown in Fig. 4 in the same way as with the bridge circuit shown in Fig. 2, as is apparent to one skilled in the art.

When making a survey with the forms of apparatus illustrated in Figs. 1–4, the electrodes $E_1$ and $E_2$ are preferably moved simultaneously as a unit to different depths in the borehole, either continuously or intermittently, to successively vary the two paths of current flow, and measurements are taken either continuously or intermittently, which are indicative of variations in the anisotropy of the formation adjacent the borehole at the different depths.

It will be appreciated that it is not necessary to maintain electrodes $E_1$ and $E_2$ at a fixed distance from one another, nor is it necessary to move the electrode $E_2$ to different depths in the borehole when the electrode $E_1$ is moved to different depths. For example, the electrode $E_2$ may be located at a fixed depth in the borehole, or it may comprise the casing when the casing does not extend down to the depths at which the electrode $E_1$ is located, or the electrode $E_2$ may be located on the earth's surface adjacent the borehole. In any case the electrode $E_2$ is spaced vertically from the electrode $E_1$ and movement of the electrode $E_1$ to successively different depths causes the current to flow successively through the strata at the different depths in a path transverse to the bedding planes thereof.

Referring to Fig. 5, a modified apparatus arrangement is shown. With this arrangement an energizing electrode $I_1$ is shown located in a borehole 21 and in contact with the conductive fluid contained therein. A second energizing electrode $I_2$ is shown connected to the earth at a position so removed from the borehole 21 as to cause an appreciable flow of current in a path along and parallel to the bedding planes of the strata adjacent the borehole when a potential difference is applied between electrodes $I_1$ and $I_2$. For example, the electrode $I_2$ may be removed by a distance which is preferably on the order of a third or more of the distance of the electrode $I_1$ in the borehole beneath the surface of the earth. A controllable source of electric current is diagrammatically indicated at 22 and may comprise, for example, a source of direct current or high or low frequency alternating current, or a source of intermittent unidirectional or reversed pulsating current. The electrodes $I_1$ and $I_2$ are connected to the current source 22 through suitably insulated conductors 23 so that an electric current may be passed through the earth between these energizing electrodes. A suitable indicating or recording current measuring instrument 24 is shown inserted in one of the conductors 23 for indicating or recording the value of the energizing current.

Potential electrodes $E_4$ and $E_5$ are shown located in the borehole 21 in contact with the fluid contained therein and spaced vertically from one another and from the energizing electrode $I_1$. A third potential electrode $E_6$ is shown connected to the earth at a position spaced from the borehole and from the energizing electrode $I_2$. The electrodes $E_6$ and $I_2$ are preferably arranged substantially along a single straight line passing through the borehole, and electrode $E_6$ is preferably spaced from the borehole by a distance on the order of one-third or more of the distance of the electrode $I_1$ beneath the earth's surface. The electrode $E_6$ may be placed closer to the borehole if desired. The electrodes $E_6$ and $I_2$ may be placed closer together and, if desired, conductors 23 and 27, connected to electrodes $I_2$ and $E_6$ respectively, may both be connected to electrode $I_2$, in which case electrode $E_6$ would be eliminated.

The earth circuits between the electrodes $E_4$ and $E_6$, and $E_4$ and $E_5$ may be employed as the adjacent arms of a modified four-arm bridge circuit, the other two arms of the bridge being artificially supplied by resistances or impedances 25 and 26. An insulated conductor 27 connects electrode $E_6$ to the bridge arm 25 and an insulated conductor 28 connects the electrode $E_4$ to the bridge arm 26. Electrode $E_5$ is connected by an insulated conductor 29 through galvanometer 30 or other potential responsive measuring means to a point on the bridge formed by a common connection to arms 25 and 26.

Upon passing electric current through the earth between the electrodes $I_1$ and $I_2$, a flow of such current is caused to pass in a path substantially along and parallel to the bedding planes of the strata due to the relative positions of electrodes $I_1$ and $I_2$. This flow of current produces a potential difference between the electrodes $E_5$ and $E_6$ which varies when the amount of current flowing through this circuit along and parallel to the bedding planes of the strata varies. Due to the spreading of current paths adjacent the electrode $I_1$, which always occurs when a current flows between an electrode and an extended conductive medium, there is also a flow of current upwardly along the borehole along a path which is substantially transverse to the bedding planes of the strata. This flow of current produces a potential difference between the electrodes $E_4$ and $E_5$ which varies when the flow of current along the path substantially transverse to the bedding planes of the strata varies.

Thus the ratio of the effects produced between the electrodes $E_4$ and $E_5$, and $E_5$ and $E_6$ may be used as a measure of the anisotropy of the strata traversed by the borehole. This relation may be obtained by making a record of the values of the resistances 25 and 26 required to balance the bridge and give a null reading on the galvanometer 30. It should be noted that the above-described measuring circuit is considered as a four-arm bridge circuit even though no directly connected source of potential is shown, since the potential is supplied between the respective pairs of potential electrodes and is created by the flow of energizing current through the earth between the energizing electrodes.

Figure 6:
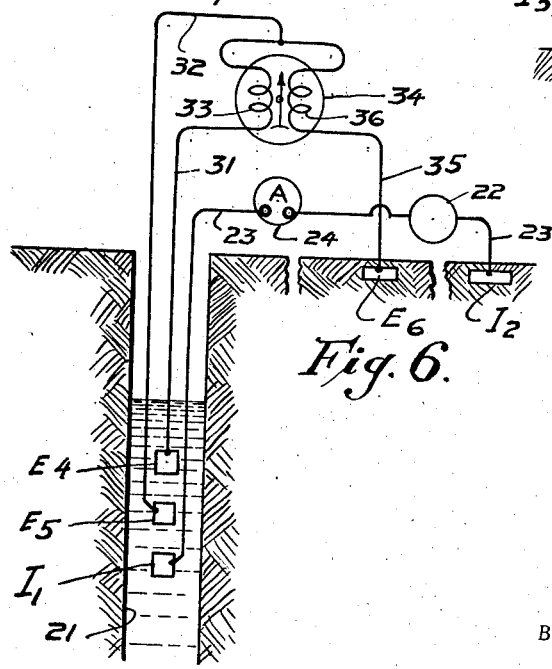
Figs. 6 and 7 are diagrammatic cross-sections showing further modified forms of apparatus which may be used for obtaining measurements indicative of variations in the difference between an electrical characteristic of the strata in two transverse directions.

A further modified arrangement of apparatus is illustrated in Fig. 6, and may use the same energizing circuit and electrode arrangement as shown in Fig. 5. With this arrangement the electrodes $E_4$ and $E_5$ are respectively connected through insulated conductors 31 and 32 to opposite sides of a coil 33 of a double coil potential-responsive measuring instrument 34. In this case electrode $E_4$ is shown located above electrode $E_5$. Electrode $E_6$ is connected through an insulated conductor 35 to one side of the remaining coil 36 of the instrument 34, the other side of this coil being connected to conductor 31.

The measuring instrument 34 may comprise the two coils 33 and 36 mounted for rotation about the same axis and operable to produce a meter indication which is indicative of the difference of the potentials applied to the respective coils, the coils being so arranged that the potentials applied thereto will tend to rotate them in opposite directions. It will be appreciated, of course, that other potential-responsive means may be provided for obtaining an indication of the difference of two potentials without using a double coil indicating instrument. For example, the coils 33 and 36 may be replaced by the input circuits of vacuum tube amplifiers, in which case the current outputs of the two amplifiers may be made to produce a single current which may be used to actuate a single coil instrument, which current varies with the difference of the potentials supplied to the respective input circuits.

As with the arrangement illustrated in Fig. 5, the passage of current through the earth between the electrodes $I_1$ and $I_2$ will produce potential differences between electrodes $E_5$ and $E_6$, and $E_4$ and $E_5$. The resulting difference between these two potentials may be indicated by the instrument 34. By controlling the value of current in the energizing circuit, preferably maintaining it at a constant value, the variations in indications of the instrument 34 may be used as an indication of the variations in the differences between the electrical properties of the strata in the desired two transverse directions of the formation traversed by the borehole.

When taking measurements with the apparatus illustrated in Figs. 5 and 6 the electrodes $I_1$, $E_4$, and $E_5$ may be moved to different depths in the borehole, and measurements may be made either continuously or intermittently with the electrodes located at the different depths. For example, we may move the three electrodes simultaneously to the different depths while maintaining them in a fixed space relation. As another example, with the arrangement illustrated in Fig. 6, we may locate the electrode $E_4$ at a fixed position either within the borehole or in contact with the earth adjacent the borehole, and move the electrodes $E_5$ and $I_1$ simultaneously to different depths while taking measurements. Also, the electrodes $E_6$ and $I_2$ may be replaced by a single electrode.

Figure 7:
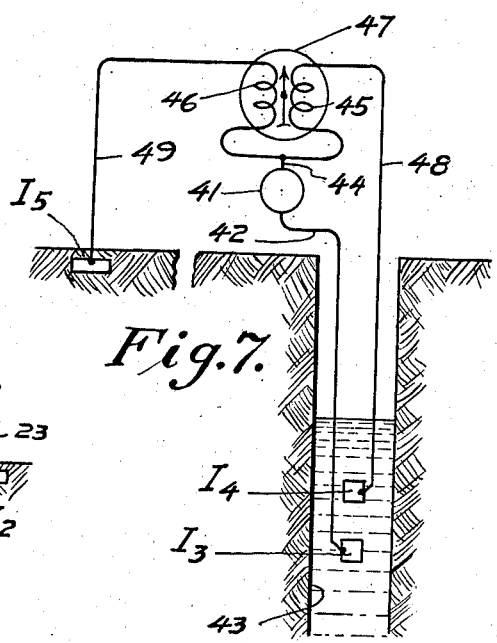

Referring to Fig. 7, another arrangement for obtaining variations in the difference between the electrical properties of the strata in two transverse directions is illustrated. A controlled current source 41, which may be comparable to the source 22, is shown connected through an insulated conductor 42 to an energizing electrode $I_3$ located within a borehole 43 and in contact with the conductive fluid contained therein. The opposite side of the current source 41 is connected through a conductor 44 to current-responsive coils 45 and 46 of a double coil measuring instrument 47, which may be otherwise comparable to instrument 34. Coils 45 and 46 have their remaining sides respectively connected to electrodes $I_4$ and $I_5$ through insulated conductors 48 and 49. Electrode $I_4$ is shown located within the borehole and in electrical contact with the conductive fluid contained therein and spaced vertically from the electrode $I_3$, while electrode $I_5$ is shown connected to the earth at a position sufficiently removed from the borehole to cause an appreciable portion of the current passing through the earth between the electrodes $I_3$ and $I_5$ to flow in a path substantially along and parallel to the bedding planes of the strata adjacent the borehole.

It may be seen that the current flowing from source 41 and in conductors 42 and 44 is the sum of the currents flowing in two earth circuits; one earth circuit which extends in a direction substantially transverse to the bedding planes of the strata between the electrodes I₃ and I₄, and the other earth circuit which extends through the earth between the electrodes I₃ and I₅ and includes a path substantially along and parallel to the bedding planes of the strata adjacent electrode I₃. The currents flowing in these respective circuits will pass through coils 45 and 46 respectively. The current flowing in each of these paths will vary with the conductivity of the path, it being assumed that the conductivity of the current-responsive instrument 47 is comparatively high, so that by controlling the potential of the current source 41, preferably maintaining it constant, variations in the difference in current traversing the coils 45 and 46 and consequently variations in the indications of the instrument 47, may be used as a direct indication of variations in the difference between the conductivities in the desired two transverse directions of the strata in the formation traversed by the borehole.

It is appreciated that numerous modifications and changes will become apparent to those skilled in the art in view of this discovery that the relative characteristics of strata in two directions may be measured directly, and that numerous forms of measuring circuits embodying the simultaneous use of two earth circuits may be substituted for those shown and described herein; hence we do not choose to be limited to the embodiments shown and described, but rather to the scope of the appended claims.

We claim:

1. In a method of determining the nature of the geologic formation traversed by a bore hole at different depths, the steps which comprise: passing electric current through the earth between electrodes connected thereto, in such manner as to produce a flow of electric current through the formation adjacent the borehole in a direction substantially along and parallel to the bedding planes of the strata of the formation and also to produce a flow of current in a direction substantially transverse to the bedding planes of the said strata adjacent the borehole; and taking an electrical measurement indicative of the relation between an electrical characteristic of the formation in a direction substantially along and parallel to the bedding planes of the strata and a comparable electrical characteristic in a direction substantially transverse to the bedding planes of said strata.

2. In a method of determining the nature of a geologic formation traversed at different depths by a borehole, the steps which comprise: passing an electric current through the formation adjacent a borehole in a direction substantially along and parallel to the bedding planes of the strata between an electrode in the borehole and a second electrode connected to the earth at a position removed from the borehole; simultaneously passing an electric current through the formation in a direction substantially transverse to the bedding planes of said strata between two vertically spaced electrodes at least one of which is located in said borehole; and taking an electrical measurement indicative of the relation between an electrical characteristic of the formation in a direction substantially along and parallel to the bedding planes of the strata and a comparable electrical characteristic in a direction substantially transverse to the bedding planes of said strata.

3. In a method of determining the nature of a geologic formation traversed at different depths by a borehole, the steps which comprise: passing an electric current through the formation adjacent a borehole in a direction substantially along and parallel to the bedding planes of the strata between an electrode in the borehole and a second electrode connected to the earth at a position removed from the borehole; simultaneously passing an electric current through the formation in a direction substantially transverse to the bedding planes of said strata between two vertically spaced electrodes at least one of which is located in said borehole; taking an electrical measurement indicative of the relation between an electrical characteristic of the formation in a direction substantially along and parallel to the bedding planes of the strata and a comparable electrical characteristic in a direction substantially transverse to the bedding planes of said strata; and repeating the steps of passing such an electric current between said electrodes and of taking such a measurement with the electrodes in the borehole located at different depths, whereby the relative anisotropic properties of the strata at the different depths may be determined.

4. In a method of determining the nature of a geologic formation traversed at different depths by a borehole, the steps which comprise: passing an electric current through the earth between an energizing electrode located within a borehole and a second energizing electrode connected to the earth at a position spaced from the borehole by a distance greater than one-third the depth of the first-named electrode beneath the earth's surface; taking an electrical measurement in an electrical measuring circuit indicative of the relation between an electrical characteristic of the formation in a direction substantially transverse to the bedding planes of the strata, included between potential electrodes connected to the earth and to said measuring circuit and spaced vertically from said first-named energizing electrode, at least one of said potential electrodes being located within the borehole, and a comparable electrical characteristic of the formation in a direction substantially along and parallel to the bedding planes of the strata included between said potential electrode located in the borehole and a third potential electrode connected to the earth at a position laterally removed from the borehole and connected to said measuring circuit; and repeating the steps of passing such an electric current between said energizing electrodes and of taking such a measurement with the electrodes in the borehole located at different depths, whereby the relative anisotropic properties of the strata at different depths may be determined.

5. In a method of determining the nature of a geologic formation traversed at different depths by a borehole, the steps which comprise: producing a flow of electric current in a path substantially transverse to the bedding planes of the strata in the formation adjacent a borehole between an electrode in the borehole and another electrode spaced vertically from said first-named electrode, and in a path substantially along and parallel to the bedding planes of such strata adjacent the borehole between said first-named electrode and a third electrode connected to the earth at a position laterally removed from the borehole; and taking a measurement indicative of the difference in the currents flowing in said paths.

6. In an apparatus for use in determining the nature of the geologic formation traversed by a borehole at different depths, the combination which comprises: means for producing a flow of electric current in a direction substantially transverse to the bedding planes of the strata adjacent a borehole in the formation traversed by a borehole and a flow of electric current in a direction substantially along and parallel to the bedding planes of such strata, including electrode means; and means for directly measuring the relation between an electrical characteristic of the paths of said currents flowing in said two directions.

7. In an apparatus for determining the nature of the geologic formation traversed by a borehole at different depths, the combination which comprises: a pair of electrodes positioned in the borehole and spaced vertically from one another; a source of electric current connected to said electrodes and operable to produce a flow of electric current in a path between said electrodes and through the formation adjacent said electrodes in a direction substantially transverse to the bedding planes of the strata in said formation; an electric circuit including a source of current connected between one of said electrodes and a third electrode so removed from the borehole that the flow of current between said electrodes is in a path substantially along and parallel to the bedding planes of said strata; an electrical measuring circuit including electrode means connected in circuit in each of said current paths; and an electrical measuring instrument associated with said circuit and operable to produce indications in response to the relation between an electrical characteristic of the formation in a direction substantially along and parallel to the bedding planes of the strata and a comparable electrical characteristic in a direction substantially transverse to the bedding planes of said strata.

8. An apparatus for determining the anisotropy of the formation traversed by a borehole, which comprises: an electric measuring circuit including an earth circuit through the formation in a direction substantially transverse to the bedding plaes of the strata between a potential electrode located in the borehole and connected to the earth and another potential electrode connected to the earth at a position spaced vertically from said first-named potential electrode, and another earth circuit through the formation in a direction substantially along and parallel to the bedding planes of the strata between said first-named potential electrode and a third potential electrode connected to the earth at a position laterally removed from the borehole; an electric energizing circuit including a source of electric current connected in circuit with an energizing electrode located within the borehole and spaced vertically from said first-named potential electrodes, and a second energizing electrode connected to the earth at a position spaced from the borehole by a distance greater than one-third the depth of said other energizing electrode beneath the earth's surface; and an electrical measuring means connected in said measuring circuit and responsive to the relation between the potential differences produced in said two earth circuits by the flow of energizing current between said energizing electrodes.

9. An apparatus for determining the anisotropy of a formation traversed by a borehole, which comprises: a pair of electrodes positioned within a borehole and spaced vertically from one another and in electrical contact with the fluid contained therein; a third electrode electrically connected to the earth at a position laterally removed from said borehole; means for moving said pair of electrodes to different depths in said borehole; and means associated with said electrodes for directly measuring a quantity indicative of variations in the anisotropy of the strata at different depths.

10. An apparatus for determining the anisotropy of a formation traversed by a borehole, which comprises: a pair of electrodes positioned within a borehole and spaced vertically from one another and in electrical contact with the fluid contained therein; a third electrode electrically connected to the earth at a position laterally removed from said borehole; an electric circuit through the earth between said pair of electrodes in a direction substantially transverse to the bedding planes of the strata in said formation adjacent the borehole; a second electric circuit through the earth between one electrode of said pair and said other electrode in a direction substantially along and parallel to the bedding planes of the strata in said formation adjacent the borehole; and a four-arm bridge circuit including said electrical circuits as adjacent arms.

11. An apparatus for determining the anisotropy of a formation traversed by a borehole, which comprises: an electrode located within a borehole and in electrical connection with the earth; a second electrode in electrical connection with the earth and spaced vertically from said first-named electrode; a third electrode connected to the earth at a position laterally removed from the borehole; a source of electric current connected to said electrodes, whereby current is caused to flow in a path substantially transverse to the bedding planes of the strata in the formation adjacent the borehole between said first-named and said second electrode, and in a path substantially along and parallel to the bedding planes of such strata adjacent the borehole between said first-named electrode and said third electrode; and current-responsive measuring means connected to said electrodes for directly measuring the difference in current flowing in said paths.

JOHN JAY JAKOSKY.
PATRICK B. LYONS.